United States Patent
Peterson

(10) Patent No.: US 9,581,270 B2
(45) Date of Patent: Feb. 28, 2017

(54) WIRE TRAY FOR A WIRE HARNESS ASSEMBLY

(71) Applicant: Tyco Electronics Corporation, Berwyn, PA (US)

(72) Inventor: Kevin John Peterson, Kernersville, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 112 days.

(21) Appl. No.: 14/538,870

(22) Filed: Nov. 12, 2014

(65) Prior Publication Data

US 2016/0134089 A1 May 12, 2016

(51) Int. Cl.
*F16L 3/23* (2006.01)
*H02G 3/04* (2006.01)
*B60R 16/02* (2006.01)

(52) U.S. Cl.
CPC ............ *F16L 3/23* (2013.01); *B60R 16/0207* (2013.01); *H02G 3/0487* (2013.01)

(58) Field of Classification Search
USPC ............................ 174/72 A, 74 A, 68.3, 101
See application file for complete search history.

(56) References Cited

U.S. PATENT DOCUMENTS

| | | | | |
|---|---|---|---|---|
| 6,146,788 A | * | 11/2000 | Ikeda | H01M 2/206 429/121 |
| 6,346,011 B1 | * | 2/2002 | Ikeda | H01M 2/1077 439/500 |
| 7,077,704 B2 | * | 7/2006 | Ikeda | H01M 2/206 439/251 |
| 2003/0222183 A1 | * | 12/2003 | Kato | H02G 3/0487 248/49 |
| 2005/0045361 A1 | * | 3/2005 | Arai | H02G 3/0487 174/72 A |
| 2005/0217888 A1 | * | 10/2005 | Arai | H02G 3/0487 174/72 A |
| 2006/0219423 A1 | * | 10/2006 | Suzuki | B60R 16/0215 174/72 A |

* cited by examiner

Primary Examiner — William H Mayo, III
Assistant Examiner — Krystal Robinson

(57) ABSTRACT

A wire tray includes tray walls defining a tray channel configured to receive corresponding wires of a wire bundle. A wire cradle extends from a corresponding tray wall. The wire cradle has a cradle channel open to the tray channel having a wire exit at a front of the wire cradle. The wire cradle has a pocket and a protrusion aligned with the pocket on an opposite side of the cradle channel. The wire is routed in the cradle channel around the protrusion into the pocket to form at least two bends in the wire between the tray channel and the wire exit. The wire cradle includes a retention cap extending into the cradle channel that captures the wire in the cradle channel.

20 Claims, 2 Drawing Sheets

WIRE TRAY FOR A WIRE HARNESS ASSEMBLY

BACKGROUND OF THE INVENTION

The subject matter herein relates generally to a wire tray for a wire harness.

Wire harnesses have many uses, such as for interconnecting a transmission, control unit with solenoid connectors of a transmission. In some applications, the wire harness includes a wire tray that supports wires of a wire bundle. In some applications, the wire tray is mounted to the transmission and directs the wires between the transmission control unit and the transmission. Such wire harness support systems are not without disadvantages. For instance, the wire trays use separate wire retention clips that are inserted into pockets in the tray. The clips can be pulled out of the tray if the wire bundle is pulled on too hard, causing loose parts to be present around the working parts of the transmission. Damage to the transmission could result. Also, the wires may be easily removed from the tray after the clips are removed, which could lead to damage to the wires. Additionally, current tray designs have problems with the tray sliding on the wire bundle, such as during shipping, handling and assembly. Another problem with existing wire harness designs is that long lengths of the wires exit the tray for termination to the solenoid connectors. The exposed wires are susceptible to damage, such as from the moving parts of the transmission.

A need remains for a wire harness assembly having few loose parts, which may be secured to the wire bundle and that protects the wires from damage.

BRIEF DESCRIPTION OF THE INVENTION

In one embodiment, a wire tray is provided that is configured to support and route wires of a wire bundle between electrical components. The wire tray includes tray walls defining a tray channel configured to receive corresponding wires of the wire bundle. A wire cradle extends from a corresponding tray wall along a wire cradle axis. The wire cradle has a cradle channel open to the tray channel having a wire exit at a front of the wire cradle. The wire cradle receives a corresponding wire of the wire bundle and routes the wire to the wire exit. The wire cradle has a pocket and a protrusion aligned with the pocket on an opposite side of the cradle channel. The wire is routed in the cradle channel around the protrusion into the pocket to form at least two bends in the wire between the tray channel and the wire exit. Optionally, the wire cradle includes a retention cap extending into the cradle channel that captures the wire in the cradle channel.

In a further embodiment, a wire tray is provided that is configured to support and route wires of a wire bundle between electrical components. The wire tray includes tray walls defining a tray channel configured to receive corresponding wires of the wire bundle. A wire cradle extends from a corresponding tray wall along a wire cradle axis. The wire cradle has a cradle channel defined by cradle sidewalls and a bottom wall. The cradle channel is open to the tray channel, and has a wire exit at a front of the wire cradle. The wire cradle receives a corresponding wire of the wire bundle and routes the wire to the wire exit. The wire cradle has a retention cap extending from one of the cradle sidewalls into the cradle channel. The wire is captured in the cradle channel between the retention cap and the bottom wall.

DETAILED DESCRIPTION OF THE INVENTION

Figure 1:
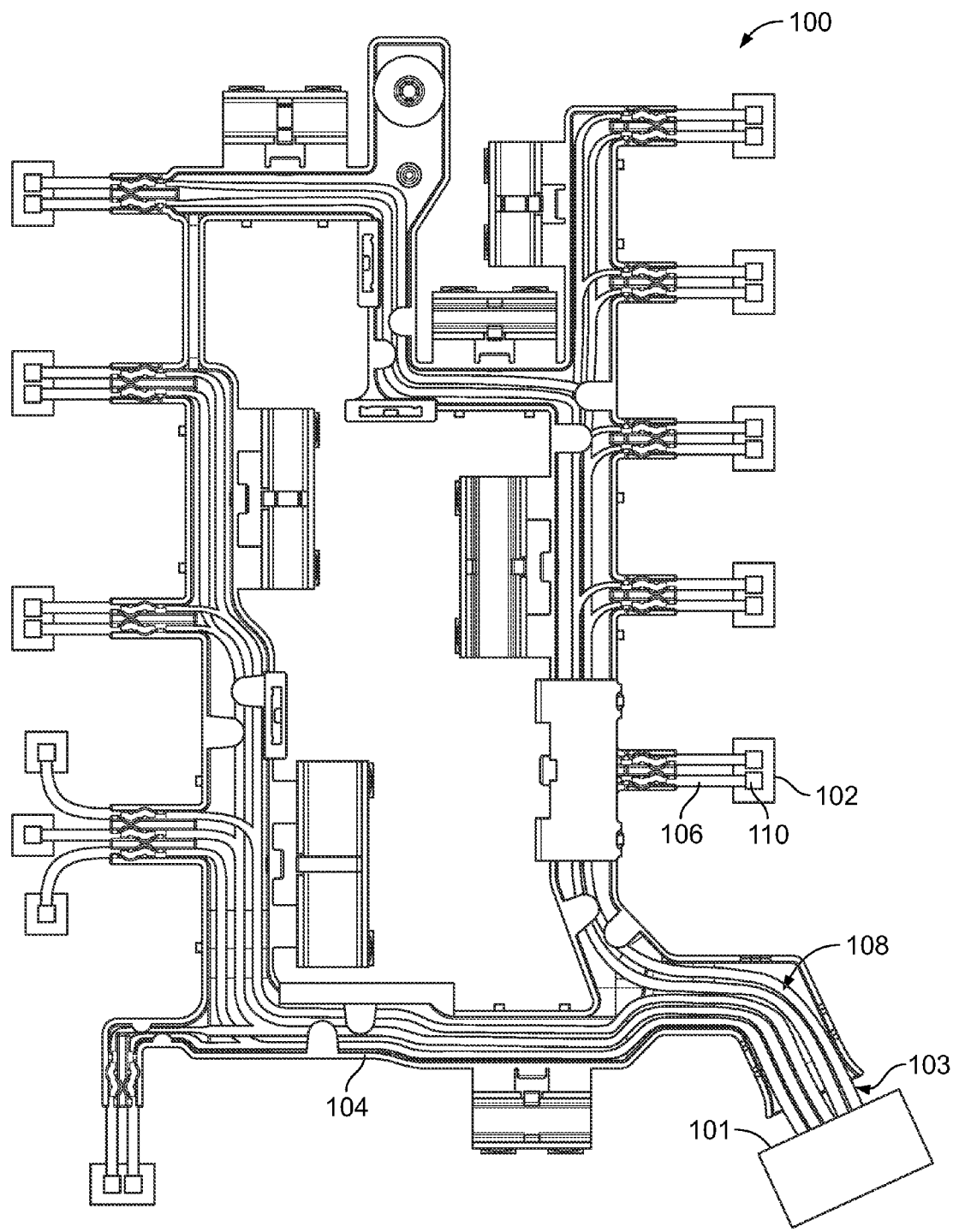
FIG. 1 illustrates a wire harness assembly including a wire bundle and a wire tray supporting the wire bundle and formed in accordance with an exemplary embodiment.

FIG. 1 illustrates a wire harness assembly 100 formed in accordance with an exemplary embodiment. In the exemplary embodiment, the wire harness assembly 100 is used to electrically connect an electrical component such as an transmission control unit connector 101, with other electrical components 102, such as solenoid connectors. The wire harness assembly 100 includes a wire harness 103 and a wire tray 104. The wire tray 104 supports and routes wires 106 of the wire harness 103, which may be arranged as a wire bundle 108, between corresponding electrical components 101, 102. The wire harness 103 includes terminals 110 terminated to ends of the wires 106, which may be terminated to the electrical components 101, 102. The wires 106 may be connected between any type of electrical components 102. In the illustrated embodiment, the wires 106 electrically connect a transmission control unit with solenoid connectors of a transmission. The wire tray 104 is configured to be mounted to the transmission and route the wires 106 to different areas of the transmission, such as for terminating to the solenoid connectors. The wire harness assembly 100 may be used in other applications in alternative embodiments.

Embodiments described herein provide features within the wire tray 104 to securely retain the wires 106 within the wire tray 104. Slippage of the wire tray 104 along the wires 106 is reduced or minimized. Embodiments described herein provide features within the wire tray 104 that protect and position the wires 106 for termination to the electrical components 102. For example, the wire tray 104 reduces the amount of the wires 106 exposed to the exterior of the wire tray 104, which protects the wires 106 from any moving parts that may be near the solenoid connectors. Embodiments described herein reduce the number of discrete pieces reducing the risk of loose pieces within the transmission and foreign object damage (FOD).

Figure 2:
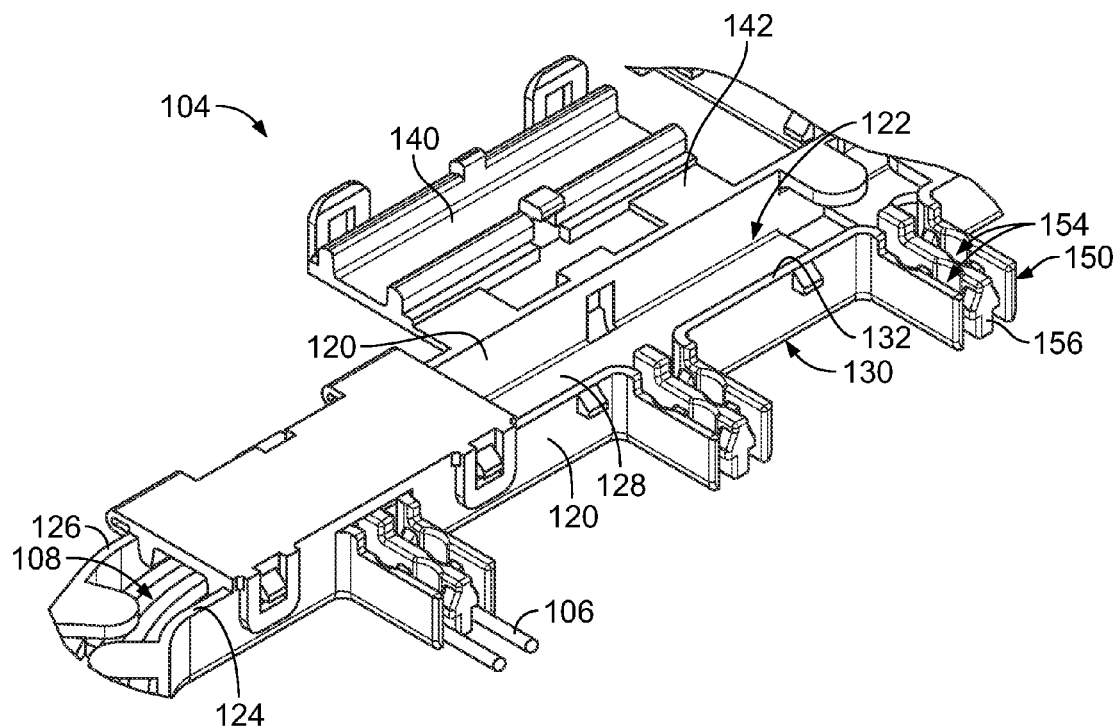
FIG. 2 is a top perspective view of a portion of the wire tray formed in accordance with an exemplary embodiment showing a plurality of wire cradles.
Figures 3, 4:
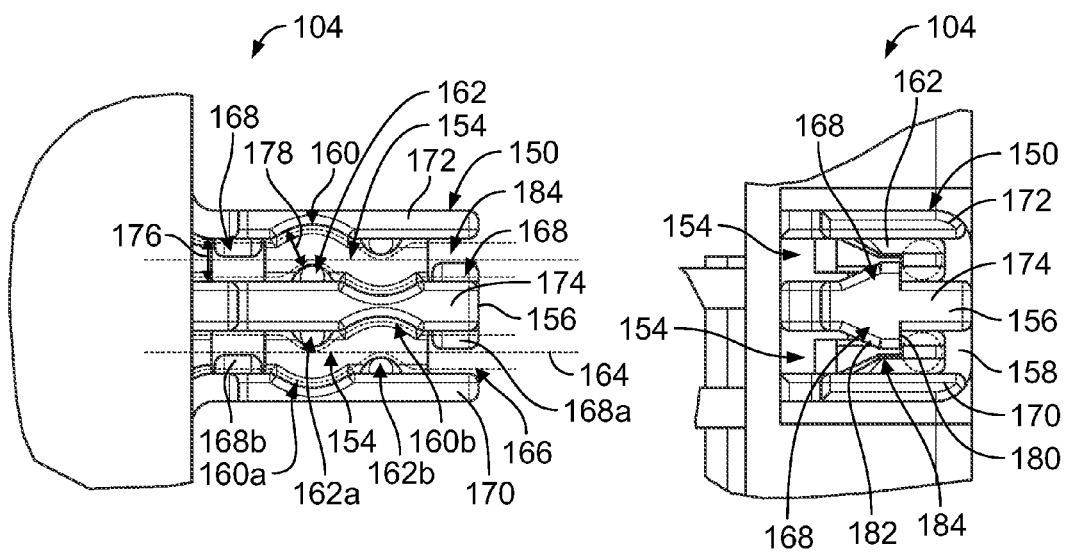
FIG. 3 is a fop view of a portion of the wire tray showing one of the wire cradles.
FIG. 4 is a front view of a portion of the wire tray showing one of the wire cradles.

FIG. 2 is a top perspective view of a portion of the wire tray 104 formed in accordance with an exemplary embodiment showing a plurality of wire cradles 150. FIG. 3 is a top view of a portion of the wire tray 104 showing one of the wire cradles 150. FIG. 4 is a front view of a portion of the wire tray 104 showing one of the wire cradles 150.

The wire tray 104 includes a plurality of tray walls 120 that define a tray channel 122 that receives the wires 106 (examples of which are illustrated in FIG. 2) of the wire bundle 108. The tray walls 120 include a first sidewall 124, a second sidewall 126 opposite the first sidewall 124, and a bottom wall 128 extending between the first and second sidewalls 124, 126 at a bottom 130 of the wire tray 104. The tray channel 122 may be open at a top 132 of the tray channel 122 along significant portions of the tray channel 122. The wires 106 may be loaded into the tray channel 122 through the open top 132.

The wire tray 104 includes one or more covers 140 coupled to the tray walls 120. In an exemplary embodiment, the cover 140 is hingedly coupled to the first sidewall 124 by a living hinge(s) 142. In an exemplary embodiment, the cover 140 and tray walls 120 are made of the same dielectric material. Optionally, the cover 140 may be co-molded and integral with the first sidewall 124. The cover 140 may be rotated about the living hinge 142 between an open position and a closed position. The wires 106 may be loaded into the tray channel 122 when the cover 140 is in the open position. The cover 140 restricts removal of the wires 106 from the tray channel 122 in the closed position.

The wire tray 104 includes one or more wire cradles 150 extending from the tray walls 120. Optionally, the wire cradles 150 may be in plane with the wire tray 104. Alternatively, the wire cradles 150 may extend below the bottom of the bottom wall 128 to direct the wires 106 (shown in phantom in FIGS. 3 and 4) to the electrical components 102 (shown in FIG. 1).

Each wire cradle 150 includes one or more cradle channel 154 that, transition the wires 106 from the tray channel 122 to the electrical components 102. In the illustrated embodiment, wire cradles 150 having two and three cradle channels 154 are illustrated, however any number of cradle channels 154 may be provided. Optionally, each cradle channel 154 may receive a single wire 106. Alternatively, the cradle channels 154 may receive more than one wire 106.

The cradle channels 154 are open to the tray channel 122. Each cradle channel 154 is open at a from 156 of the wire cradle 150. The wires 106 may extend forward from the front 156 through the corresponding opening at the front 156. In an exemplary embodiment, the wire cradle 150 includes a bottom wall 158 (FIG. 4) at a bottom of the wire cradle 150. The bottom wall 158 may be coplanar with the bottom wall 128 or may be vertically offset above or below the bottom wall 128 of the tray channel 122. The wire cradle 150 protects the wires 106 as the wires 106 transition from the tray channel 122 to the wire termination areas with the electrical components. The wire cradle 150 extends outward from the tray walls 120 to limit the lengths of wires 106 exposed to the environment, which may have moving parts (e.g. of the transmission), which could sever or damage the wires 106.

The wire cradle 150 has features that serve to hold the wires 106 in the cradle channel 154. Exemplary embodiments of such features are described with reference to FIGS. 3-4. In an exemplary embodiment, the wire cradle 150 includes at least one pocket 160 and corresponding protrusion 162 aligned with the pocket 160 on an opposite side of the cradle channel 154. The wire 106 is routed in the cradle channel 154 around the protrusion 162 into the pocket 160. Routing the wire 106 into the pocket(s) 160 forms at least two bends in the wire 106, which help hold the position of the wire 106 in the cradle channel 154. For example, the wire 106 may be at least twice bent across an associated wire cradle axis 164 of the wire cradle channel 154. As such, the wire follows a tortious path from the tray channel 122 to a wire exit 166 at the front 156 of the wire cradle 150. In an exemplary embodiment, the wire cradle 150 has at least one retention cap 168 extending into the cradle channel 154. The wire 106 is captured in the cradle channel 154 between the retention cap(s) 168 and the bottom wall 158. The protrusions 162, pockets 160 and/or retention caps 168 resist slipping of the wire tray 104 relative to the wire bundle 108. The protrusions 162 pockets 160 and/or retention caps 168 ensure that the wires 106 remain in position within the wire cradle 150.

The wire cradle 150 includes a plurality of walls forming the cradle channel(s) 154. In an exemplary embodiment, the wire cradle 150 includes end walls 170, 172 that define outer walls of the wire cradle 150 and that extend from, the tray walls 120 to the front 156 of the wire cradle 150. Optionally, the wire cradle 150 may include at least one midwall 174 between the end walls 170, 172. The midwall 174 extends generally from the tray channel 122 to the front 156. The midwall 174 separates adjacent cradle channels 154. For example, the midwall 174 may define cradle sidewalls for the associated cradle channel 154, and may be referred to hereinafter as sidewalls 174. The end walls 170, 172 may define cradle sidewalls for the associated cradle channels 154, and may be referred to hereinafter as sidewalls 170, 172. One cradle channel 154 may be positioned between the end wall 170 and the midwall 174, while another cradle channel 154 may be positioned between the end wall 172 and the midwall 174. Optionally, a cradle channel 154 may be positioned between two midwalls 174.

In an exemplary embodiment, each cradle channel 154 includes at least two pockets 160a, 160b (FIG. 3), which are axially offset from each other along the wire cradle axis 164. The first pocket 160a is formed in the first cradle sidewall 170 and the second pocket 160b is formed in the second cradle sidewall 174. As such, the pockets 160a, 160b are on opposite sides of the cradle channel 154. The end wall 170 and midwall 174 are thinned in the area of the pockets 160a, 160b, allowing the wire 106 to traverse at least partially into the end wall 170 and the midwall 174. In an exemplary embodiment, each cradle channel 154 includes at least two protrusions 162a, 162b (FIG. 3), which are axially offset from each other along the wire cradle axis 164. The first protrusion 162a extends into the cradle channel 154 from the second cradle sidewall 174 and the second protrusion 162b extends into the cradle channel 154 from the first cradle sidewall 170. As such, the protrusions 162a, 162b are on opposite sides of the cradle channel 154. The wire 106 is routed in the first, and second pockets 160a, 160b around the protrusions 162a, 162b to form at least three bends in the wire 106 between the Cray channel 122 and the wire exit 166. Optionally, a normal width 176 of the cradle channel 154, such as between the tray channel 122 and the first pocket 160a, between the first and second pockets 160a, 160b and between the second pocket 160b and the wire exit 166, is approximately equal to a pocket width 178 of the cradle channel 154 through the pockets 160a, 160b. Optionally, the pocket width 178 may be slightly narrower, such as to compress the wire 106 through the cradle channel 154 in the pockets 160a, 160b. Optionally, the normal width 176 may be slightly narrower than the pocket width 178, such as to compress the wire 106 through the cradle channel 154 in those areas.

In an exemplary embodiment, the wire 106 is at least partially compressed by the protrusions 162a, 162b to hold the wire 106 in the cradle channel 154 by an interference fit. For example, where the wire 106 bends, the wire may be at least partially compressed. The wire 106 may be at least partially compressed at the corners defined at the entrances and exits of the pockets 160a, 160b. The wire 106 may be at least partially compressed between the protrusions 162a, 162b and the pockets 160a, 160b, respectively.

The retention caps 168 extend into the cradle channels 154 to retain the wires 106 therein. For example, the retention caps 168 block the wires 106 from lifting out of the cradle channels 154. The retention caps 168 hold the wires 106 against the bottom wall 158. Optionally, the wires 106 may be at least partially compressed between the retention caps 168 and the bottom wall 158 to hold the wires 106 in the cradle channel 154 by an interference fit.

In an exemplary embodiment, each cradle channel 154 includes at least two retention caps 168a, 168b (FIG. 3), which are axially offset from each other along the wire cradle axis 164. The first retention cap 168a extends from the midwall 174 and the second retention cap 168b extends from the end wall 170. As such, the retention caps 168a, 168b are on opposite sides of the cradle channel 154. The wire 106 may be routed into the cradle channel 154 from above and pressed down below the retention caps 168. For example, the wire 106 may be pressed between the first retention cap 168a and the end wall 170 and between the second retention cap 168b and the midwall 174.

The retention caps 168 have ledges 180 (FIG. 4) that face the bottom wall 158. The ledges 180 capture the wires 106. The retention caps 168 may have ramped transition surfaces 182 (FIG. 4) that guide the wires 106 toward the walls 170, 174 during loading of the wires 106 into the cradle channel 154. Optionally, gaps 184 are defined between the retention caps 168 and the walls 170, 174. The wires 106 are pressed through the gaps 184 until the wires 106 are captured under the ledges 180. The gaps 184 may be narrower than a diameter of the wire 106 to ensure that the wire 106 is captured in the cradle channel 154. For example, as the wire 106 is loaded through the gap 184, the wire 106 is partially compressed (e.g., the insulative jacket is partially compressed) to fit through the gap 184. After the wire 206 is in the cradle channel 154 below the retention cap 168, the wire 106 expands to the normal diameter and is trapped below the ledge 180.

Having the wires 106 bent and secured in the wire cradles 150 helps maintain the position of the wire tray 104 along the wire bundle 108 and maintains the bent wires 106 within the wire tray 104. For example, the wire tray 104 is stopped from sliding or moving along the wire bundle 108 by the bends in the wire 106. The wires 106 may engage the surfaces of the wire cradle 150 to create a friction between the wire tray 104 and the wires 106, which may reduce slippage or movement between the wire tray 104 and the wires 106. Additionally, having the wires 106 transition in multiple different directions in the cradle channels 154 provides additional resistance to slippage of the wire tray 104 on the wire bundle 108.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A wire tray configured to support and route wires of a wire bundle between electrical components, the wire tray comprising:
   tray walls defining a tray channel configured to receive corresponding wires of the wire bundle;
   a wire cradle extending from a corresponding tray wall along a wire cradle axis, the wire cradle having a cradle channel open to the tray channel, the cradle channel having a wire exit at a front of the wire cradle, the wire cradle receiving a corresponding wire of the wire bundle and routing the wire to the wire exit, the wire cradle having a pocket extending outward away from the wire cradle axis and a protrusion aligned with the pocket along the wire cradle axis on an opposite side of the cradle channel extending inward into the wire cradle forcing the wire into the pocket, the wire being routed in the cradle channel around the protrusion into the pocket to form at least two bends in the wire between the tray channel and the wire exit.

2. The wire tray of claim 1, wherein the wire is at least partially compressed by the protrusion to hold the wire in the cradle channel by an interference fit.

3. The wire tray of claim 1, wherein the wire is at least twice bent across the wire cradle axis.

4. The wire tray of claim 1, wherein the wire follows a tortious path from the tray channel to the wire exit.

5. The wire tray of claim 1, wherein a width of the cradle channel between the tray channel and the pocket is equal to a width of the cradle channel around the protrusion and through the pocket.

6. The wire tray of claim 1, wherein the pocket comprises a first pocket and the protrusion comprises a first protrusion, the wire cradle further comprising a second pocket and a second protrusion aligned with the second pocket on an opposite side of the cradle channel, the wire being routed in the first and second pockets to form at least three bends in the wire between the tray channel and wire exit.

7. The wire tray of claim 1, wherein the cradle channel is defined by first and second cradle sidewalls, the pocket being formed in the first cradle sidewall, the protrusion extending from the second cradle sidewall.

8. The wire tray of claim 7, further comprising a second pocket formed in the second cradle sidewall and a second protrusion extending from the first cradle sidewall.

9. The wire tray of claim 1, wherein the wire cradle includes a mid-wall extending between first and second end walls from the tray wall to the front of the wire cradle, the cradle channel being defined between the mid wall and the first end wall, a second cradle channel being defined between the mid wall and the second end wall, the second cradle channel having a pocket and a protrusion aligned with the pocket on an opposite side of the cradle channel.

10. The wire tray of claim 1, wherein the wire cradle further comprises a retention cap extending into the cradle channel, the retention cap capturing the wire in the cradle channel.

11. The wire tray of claim 10, wherein the cradle channel is defined between first and second cradle sidewalls and a bottom wall, the retention cap extending from the first cradle sidewall into the cradle channel, the wire being captured between the retention cap and the bottom wall.

12. The wire tray of claim 11, further comprising a second retention cap extending from the second cradle sidewall into the cradle channel, the retention cap being axially offset relative to the second retention cap along the wire cradle axis.

13. The wire tray of claim 1, wherein the cradle channel receives a plurality of wires.

14. A wire tray configured to support and route wires of a wire bundle between electrical components, the wire tray comprising:

tray walls defining a tray channel configured to receive corresponding wires of the wire bundle;

a wire cradle extending from a corresponding tray wall along a wire cradle axis, the wire cradle having a cradle channel defined by cradle sidewalls and a bottom wall, the cradle channel being open to the tray channel, the cradle channel having a wire exit at a front of the wire cradle, the wire cradle receiving a corresponding wire of the wire bundle and routing the wire to the wire exit, the wire cradle having a retention cap extending from one of the cradle sidewalls into the cradle channel, the wire being captured in the cradle channel between the retention cap and the bottom wall.

15. The wire tray of claim 14, wherein the wire is at least partially compressed by the retention cap to hold the wire in the cradle channel by an interference fit between the retention cap and the bottom wall.

16. The wire tray of claim 14, wherein the cradle channel is defined between first and second cradle sidewalls, the retention cap extending from the first cradle sidewall into the cradle channel, the wire cradle further comprising a second retention cap extending from the second cradle sidewall into the cradle channel, the retention cap being axially offset relative to the second retention cap along the wire cradle axis.

17. The wire tray of claim 14, wherein the retention cap includes ledge, the wire being captured between the ledge and the bottom wall.

18. The wire tray of claim 14, wherein a gap is defined between the retention cap and the opposite cradle sidewall, the gap having a width narrower than a diameter of the wire, the wire being compressed as the wire is pressed through the gap beneath the retention cap.

19. The wire tray of claim 14, wherein the wire cradle includes a mid-wall extending between first and second end walls from the tray wall to the front of the wire cradle, the cradle channel being defined between the mid wall and the first end wall, a second cradle channel being defined between the mid wall and the second end wall, the second cradle channel having a corresponding retention cap extending into the second cradle channel.

20. The wire tray of claim 14, wherein the cradle channel receives a plurality of wires captured below the retention cap.

* * * * *